United States Patent
Hartig

(10) Patent No.: US 9,650,120 B2
(45) Date of Patent: May 16, 2017

(54) ELECTRIC DRIVE SHAFT AND VEHICLE COMPRISING SUCH AN ELECTRIC DRIVE SHAFT

(75) Inventor: Rainer Hartig, Buxtehude (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 1161 days.

(21) Appl. No.: 13/499,144

(22) PCT Filed: Sep. 29, 2010

(86) PCT No.: PCT/EP2010/064461
§ 371 (c)(1),
(2), (4) Date: Mar. 29, 2012

(87) PCT Pub. No.: WO2011/039256
PCT Pub. Date: Apr. 7, 2011

(65) Prior Publication Data
US 2012/0190554 A1   Jul. 26, 2012

(30) Foreign Application Priority Data
Sep. 30, 2009  (DE) ................. 10 2009 043 530

(51) Int. Cl.
*H02P 25/30* (2006.01)
*H01L 39/02* (2006.01)
(Continued)

(52) U.S. Cl.
CPC ............. *B63H 23/24* (2013.01); *B60L 11/08* (2013.01); *B63J 3/02* (2013.01); *B60L 2200/32* (2013.01);
(Continued)

(58) Field of Classification Search
CPC ...... B63H 23/24; B63H 2021/173; B63J 3/02; Y04S 10/126; Y02E 60/721;
(Continued)

(56) References Cited

U.S. PATENT DOCUMENTS

| 4,808,835 A | 2/1989 | Donoue |
| 6,188,139 B1 | 2/2001 | Thaxton et al. |

(Continued)

FOREIGN PATENT DOCUMENTS

| DE | 9413638 U1 | 12/1995 |
| DE | 9413638 U1 | 12/1995 |

(Continued)

OTHER PUBLICATIONS

Prof. Dipl. Ing. A. Wangerin; "Aktuelle Probleme der Schiffselektrotechnik"; Institut für Schiffshilfsmaschinen der TU Hannover, STG/VDE; vol. 26; pp. 520-523; 1974; DE; (Notice of Relevance).

(Continued)

*Primary Examiner* — Jared Fureman
*Assistant Examiner* — Emmanuel R Dominique
(74) *Attorney, Agent, or Firm* — Harness, Dickey & Pierce, P.L.C.

(57) ABSTRACT

An electric drive shaft is disclosed including at least one speed-variable generator for generating a voltage with a variable amplitude and a variable frequency, and at least one speed-variable drive motor supplied with the voltage. The drive shaft enables repercussions on the voltage during sudden load changes, and therefore the complexity of the regulation for stabilizing the voltage, to be reduced due to the generator including a supraconductor winding, especially a high-temperature supraconductor winding.

18 Claims, 2 Drawing Sheets

(51) Int. Cl.
*B63H 23/24* (2006.01)
*B60L 11/08* (2006.01)
*B63J 3/02* (2006.01)
  B63H 21/17 (2006.01)
  H02J 3/38 (2006.01)

(52) U.S. Cl.
CPC ..... *B60L 2220/54* (2013.01); *B60L 2270/147* (2013.01); *B63H 2021/173* (2013.01); *H02J 3/38* (2013.01); *Y02E 60/721* (2013.01); *Y02T 10/641* (2013.01); *Y02T 10/70* (2013.01); *Y02T 10/7077* (2013.01); *Y02T 70/5263* (2013.01); *Y02T 90/38* (2013.01); *Y04S 10/126* (2013.01)

(58) Field of Classification Search
CPC .. B60L 2220/54; B60L 2200/32; B60L 11/08; B60L 2270/147; Y02T 70/5263; Y02T 90/38; Y02T 10/7077; Y02T 10/70; Y02T 10/641; H02J 3/38
USPC .......................... 307/9; 440/3, 6; 322/24, 58
See application file for complete search history.

(56) References Cited

U.S. PATENT DOCUMENTS

| | | | | |
|---|---|---|---|---|
| 6,441,521 B1 * | 8/2002 | Dombrovski | ........ | H02K 21/042 310/156.01 |
| 8,118,627 B2 * | 2/2012 | Wejrzanowski | ....... | B63H 21/17 322/24 |
| 8,216,008 B2 * | 7/2012 | Daffey | ................... | B63H 21/20 440/3 |
| 8,357,019 B2 * | 1/2013 | Frizon | ................... | B63H 23/24 440/6 |
| 8,432,065 B2 * | 4/2013 | Reinkens | ................... | B63J 3/02 307/84 |
| 2003/0030339 A1 * | 2/2003 | Dombrovski | ................... | 310/91 |
| 2003/0165036 A1 * | 9/2003 | Tuladhar | ................... | H02J 3/38 361/62 |
| 2004/0020697 A1 * | 2/2004 | Field | ........................ | B60K 6/40 180/65.23 |
| 2004/0262924 A1 * | 12/2004 | Wacker | ................. | B63H 23/24 290/20 |
| 2005/0009418 A1 | 1/2005 | Ries et al. | | |
| 2005/0116689 A1 * | 6/2005 | Fogarty | ..................... | H02P 9/08 322/29 |
| 2006/0105642 A1 | 5/2006 | Ries et al. | | |
| 2007/0293104 A1 * | 12/2007 | Sandoy | ................. | B63H 23/24 440/6 |
| 2008/0315583 A1 * | 12/2008 | Beck | ..................... | B63H 21/20 290/31 |
| 2009/0108678 A1 * | 4/2009 | Algrain | ................... | H02J 3/005 307/87 |
| 2009/0156068 A1 * | 6/2009 | Barrett | ................... | B63H 21/20 440/3 |
| 2010/0094490 A1 * | 4/2010 | Alston | ................... | B63H 21/17 701/21 |
| 2010/0207457 A1 * | 8/2010 | Reinkens | ................... | B63J 3/02 307/87 |
| 2011/0128054 A1 * | 6/2011 | Kerkman | .................. | H02J 3/08 327/156 |

FOREIGN PATENT DOCUMENTS

| | | | | |
|---|---|---|---|---|
| DE | 2006059199 B3 | | 4/2008 | |
| DE | 102006059199 B3 | | 4/2008 | |
| DE | WO2009/051585 | * | 4/2009 | |
| EP | 1022218 A2 | | 7/2000 | |
| EP | 1022218 A2 | | 7/2000 | |
| EP | 2062813 A1 | | 5/2009 | |
| EP | 2062813 A1 | | 5/2009 | |
| EP | 2077226 A2 | | 7/2009 | |
| EP | 2077226 A2 | * | 7/2009 | ............. B63H 23/34 |
| GB | 2445382 | * | 9/2008 | ................ H02J 3/46 |
| GB | EP 2077226 A2 | * | 7/2009 | ............... B63G 8/08 |
| GB | EP 2077226 | * | 8/2009 | |
| JP | 2007504045 A | | 3/2007 | |
| JP | 2007131081 A | | 5/2007 | |
| KR | 20080055617 A | | 6/2008 | |
| WO | WO-03047961 A2 | | 6/2003 | |
| WO | WO 03047961 A2 | | 6/2003 | |

OTHER PUBLICATIONS

Korean Office Action and English translation thereof dated Nov. 20, 2013.
"Hybrid-Marine, Hybrid Electric Marine propulsion"; https://web.archive.org/web/20090505171739/http://www.hybrid-marine.co.uk/10.html.
Australian Office Action mailed Jul. 22, 2014.
Korean Office Action and English translation thereof dated Jul. 23, 2014.
International Search Report and Written Opinion of Searching Authority.
Australian Office Action dated Jan. 6, 2015.
Office Action for European Patent Application No. 10763353.9 dated Oct. 27, 2015.
Notice of Acceptance for Australian Patent Application No. 2015200109 dated Feb. 5, 2016.

* cited by examiner

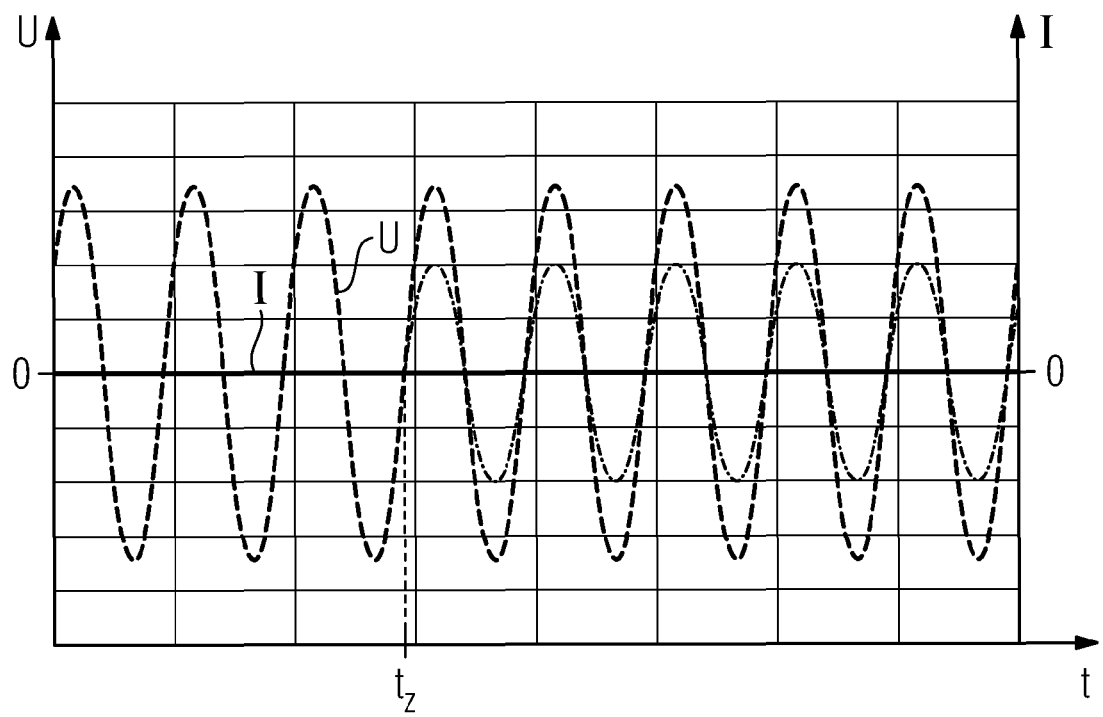

ELECTRIC DRIVE SHAFT AND VEHICLE COMPRISING SUCH AN ELECTRIC DRIVE SHAFT

PRIORITY STATEMENT

This application is the national phase under 35 U.S.C. §371 of PCT International Application No. PCT/EP2010/064461 which has an International filing date of Sep. 29, 2010, which designated the United States of America, and which claims priority to German patent application number DE 10 2009 043 530.1 filed Sep. 30, 2009, the entire contents of each of which are hereby incorporated herein by reference.

FIELD

At least one embodiment of the invention generally relates to an electric drive shaft, and/or a craft comprising such an electric drive shaft.

BACKGROUND

Electric drive shafts on ships (including for example all-electric ships) conventionally include one or more electric drive motors which are each for driving a propelling unit (for example a propeller) and are each fed by way of a respective converter by an electrical power network on the ship (frequently also called the ship's drive). The electrical power network is in turn fed by one or more diesel generators. In this arrangement, the voltage of the electrical power network is of fixedly predetermined amplitude and frequency, for example having a medium voltage with a nominal voltage of 6.6 kV at a nominal frequency of 60 Hz. Where appropriate, a transformer is additionally connected between the converter and the power network. The converters convert the power network voltage (stepped down where necessary) to a voltage required to operate the drive motors, which has a different amplitude and frequency from the power network voltage.

Low-voltage consumers on board a ship (such as the navigation equipment and control gear, public-address system, lighting) are supplied by a separate onboard power network, which conventionally has a nominal voltage of 400 V and a nominal frequency of 50 Hz, or 440 V and 60 Hz. The onboard power network may be fed with electrical energy from its own onboard power network generators, independently of the ship's drive. As an alternative, the onboard power network may be supplied from the ship's drive, by way of an onboard power network converter. The onboard power network converter converts the voltage of the ship's drive to a voltage having the amplitude and frequency of the onboard power network.

A great advantage of this solution lies in the fact that disturbances to the ship's drive as a result of abrupt changes in load (for example if a propeller goes in and out of the water in heavy seas) can be avoided as a result of the converter if the latter is of appropriate size. Alongside many other advantages, however, these drive constructions have the disadvantage that they require a relatively large number of converters for the conversion of voltage in the ship's drive, and these entail a corresponding need for space, and costs.

A known electric drive solution which manages without converters of this kind consists in coupling the generators and the drive motors to one another with no converters connected in between. With a drive solution of this kind, one or more drive motors of variable speed are operated directly, without a converter connected in between, using the voltage generated by one or more generators of variable speed, this voltage being of variable amplitude and variable frequency.

Thus, the motors and thus the propelling units are controlled and/or regulated indirectly, by control and/or regulation of the internal combustion engines for driving the generators. In this case the drive motors are connected to the generators in a fixed electrical coupling, that is to say that a rotation of the generators brings about a corresponding proportional rotation of the electric drive motors. Thus, the function of a mechanical shaft is imitated using electrical machines. A drive solution of this kind is frequently called an "electric shaft".

In this context it is also known to take off electrical energy from the electric shaft by way of an onboard power network converter, that is to say that an onboard power network converter converts the voltage generated by the generator (or generators), which is of variable amplitude and variable frequency, to a voltage of constant amplitude and constant frequency for an onboard power network.

Here, however, it is problematic that abrupt changes in load in the ship's drive directly cause disturbances, in the form of fluctuations in voltage and frequency, in the electric shaft and hence also in the onboard power network converter. This has the result on the one hand that complex regulation is required for the electric shaft, for stabilizing the speed (and hence the voltage and frequency) of the drive motors and the propelling unit. On the other hand, this may result in impermissible fluctuations in the onboard power network voltage. The onboard power network converter responds to this by performing a safety shut-off, which reduces the availability of the onboard power network, or else it has to be oversized such that it can compensate for the fluctuations in the ship's drive that are caused by the abrupt changes in load.

SUMMARY

At least one embodiment of the present invention specifies an electric drive shaft.

An electric drive shaft is disclosed. Advantageous embodiments of the electric drive shaft form the subject of the dependent claims. A craft, in particular a watercraft, comprising such an electric drive shaft is disclosed. Advantageous embodiments of the craft form the subject of dependent claims.

An electric drive shaft according to at least one embodiment of the invention includes at least one generator of variable speed, for generating a voltage of variable amplitude and variable frequency, and at least one drive motor which is supplied with this voltage and which is variable in speed. In this case, the at least one generator includes a superconductor winding, in particular a high-temperature superconductor (HTS) winding. The superconductor winding may be a stator winding or a rotating rotor winding of the generator.

BRIEF DESCRIPTION OF THE DRAWINGS

The invention, and further advantageous embodiments of the invention according to features of the subclaims, will be explained in more detail below with reference to example embodiments in the figures, in which:

FIG. 2 shows the current/voltage characteristic curve of an HTS generator when there is a sudden increase in load.

DETAILED DESCRIPTION OF THE EXAMPLE EMBODIMENTS

Figure 1:
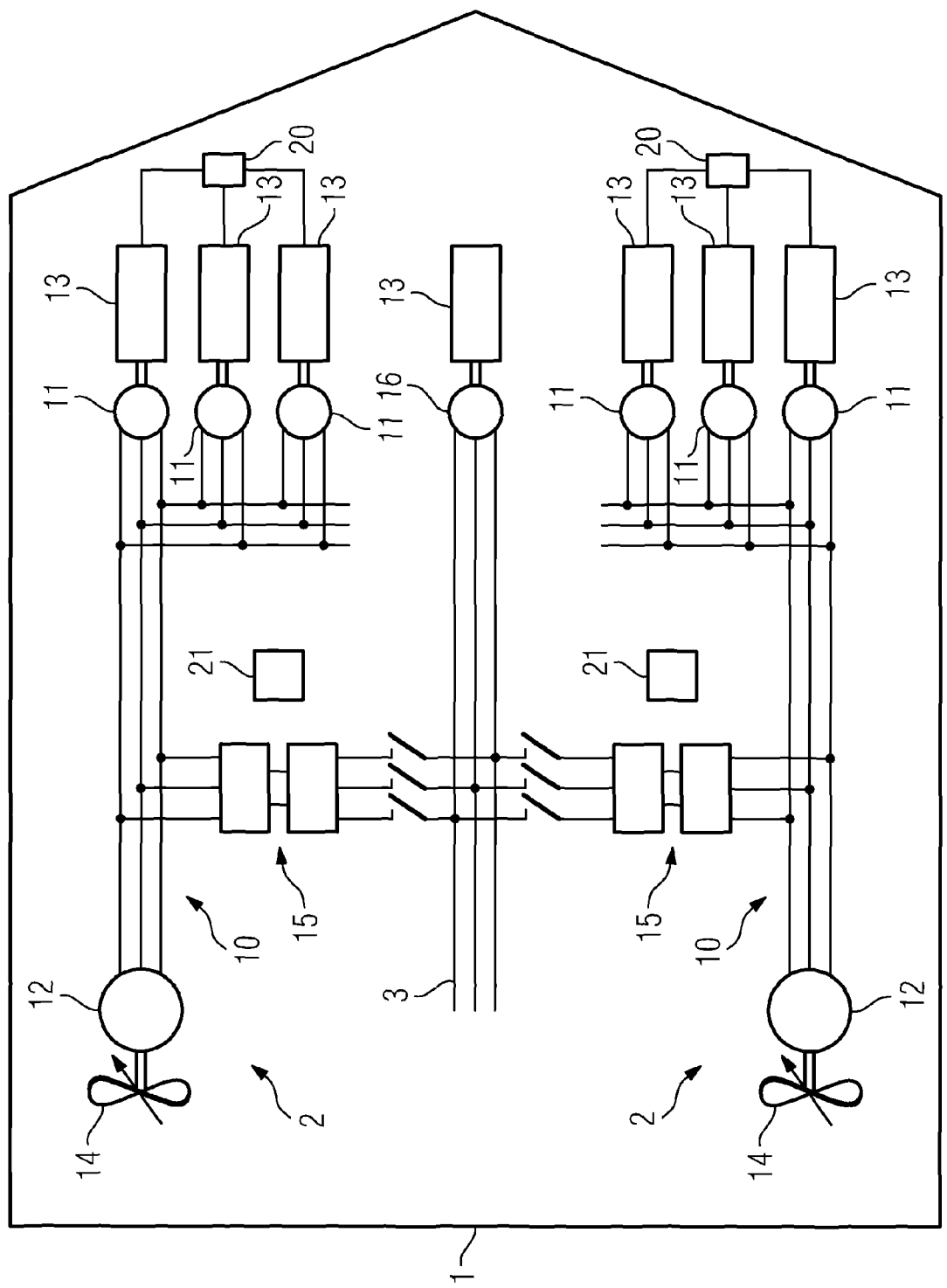
FIG. 1 shows a watercraft with an electric drive shaft according to an embodiment of the invention.

An electric drive shaft according to at least one embodiment of the invention includes at least one generator of variable speed, for generating a voltage of variable amplitude and variable frequency, and at least one drive motor which is supplied with this voltage and which is variable in speed. In this case, the at least one generator includes a superconductor winding, in particular a high-temperature superconductor (HTS) winding. The superconductor winding may be a stator winding or a rotating rotor winding of the generator.

A generator having a superconductor winding conventionally has a substantially larger magnetic air gap between the rotor and the stator than a conventional generator with no superconductor winding. This is primarily because the superconductor is cooled by a vacuum cryostat or a similar cooling device whereof the wall extends within the air gap.

The relatively large magnetic air gap has the effect that the generator has substantially less synchronous reactance than a conventional generator. This has the result that, with the same electrical output, an HTS generator has a significantly stiffer current/voltage characteristic curve than a conventional generator. As a result, in the event of a sudden increase in load or abrupt changes in load, there is no drop in the voltage generated by the generator. This allows fluctuations in voltage and frequency in the electric shaft to be reduced. Thus, there is no need for complex regulation of the electric shaft, to stabilize the voltage of the ship's drive and the speed of the drive motors and the propelling unit.

If it is also the case that the at least one drive motor includes a superconductor winding, in particular a high-temperature superconductor (HTS) winding, then it may be constructed to have a small overall size and to have very high power output and torque, which is particularly important when a watercraft is used in ice.

Preferably, the superconductor winding is a rotating rotor winding, since with this the surface to be cooled can be kept smaller than with a superconductor stator winding.

Particular advantages emerge if the electric drive shaft includes at least one onboard power network converter which is supplied with the voltage of variable amplitude and variable frequency that is generated by the generator of variable speed, and which converts this voltage to a voltage of constant amplitude and constant frequency for an onboard power network. By avoiding fluctuations in voltage and frequency on the electric shaft, because of the stiff characteristic curve of the generator or generators, it is possible to avoid impermissible fluctuations in the voltage generated by the onboard power network converter and hence safety shut-offs of the onboard power network converter or the need to oversize the onboard power network converter.

Where there are a plurality of generators of variable speed, each for generating a voltage of variable amplitude and variable frequency, the electric shaft also includes a generator synchronizing device, for synchronizing the amplitude, frequency and phase of the voltages generated by the generators.

According to a further advantageous embodiment, the electric drive shaft further includes an onboard power network synchronizing device, for synchronizing the amplitude, frequency and phase of the output voltage of the onboard power network converter to the amplitude, frequency and phase of the voltage from the onboard power network if the voltage generated by the at least one generator exceeds a predetermined minimum amplitude and minimum frequency.

A craft according to at least one embodiment of the invention, in particular a watercraft such as an icebreaker or an ice-going ship, includes at least one drive line having an electric drive shaft as described above, for driving the craft, and an onboard power network for supplying electrical consumers on board the craft.

For the onboard power network to supply voltage in port when the electric shaft is switched off, an additional harbor generator, preferably also a downstream converter, may be provided for supplying the onboard power network with a voltage of constant amplitude and frequency.

According to a further advantageous embodiment, the craft includes, coupled to the drive motor, a propelling unit, in particular a controllable-pitch propeller whereof the power output is variable, wherein the propelling unit may be set to zero thrust if the voltage generated by the at least one generator falls below a predetermined minimum amplitude and minimum frequency.

FIG. 1 shows a watercraft 1, for example an icebreaker, having two drive lines 2 for driving the watercraft and having an onboard power network 3 for supplying electrical consumers on board the watercraft. Each of the drive lines 2 includes an electric drive shaft 10 which includes a plurality of generators 11 for the ship's drive, which are variable in speed, and an electric drive motor 12. Each of the generators 11 is driven by a respective internal combustion engine 13, for example a diesel engine. A propelling unit in the form of a controllable-pitch propeller 14 is mechanically coupled to the drive motor 12. A mechanical gear system may additionally be connected between a generator 11 and the internal combustion engine 13 which drives it, and between the controllable-pitch propeller 14 and the drive motor 12 which drives it.

The drive motor 12 is operated without a converter connected in between, at the voltage generated by the generators 11, which are of variable amplitude and variable frequency. The speed of the drive motor 12 and hence of the controllable-pitch propeller 14 are thus controlled and/or regulated indirectly by control and/or regulation of the internal combustion engine 13 for driving the generators 11. Thus, a rotation of the internal combustion engine 13 or the generators 11 brings about a corresponding proportional rotation of the drive motor 12. Thus, the function of a mechanical shaft is imitated using electrical machines.

In addition, the voltage of variable amplitude and variable frequency which is generated by the generators 11 of an electric drive shaft 10 is used to operate a respective onboard power network converter 15, which converts this variable voltage to a voltage of constant amplitude and constant frequency, for the onboard power network 3. The onboard power network 3 is used to supply low-voltage consumers on the watercraft (such as the navigation equipment and control gear, public-address system, lighting), which are not illustrated in detail. The onboard power network 3 conventionally has a nominal voltage of 400 V and a nominal frequency of 50 Hz, or 440 V and 60 Hz.

An additional harbor generator 16 which is also driven by an internal combustion engine 13 serves to supply the onboard power network 3, preferably by way of a downstream converter which is not illustrated in detail, with a voltage of constant amplitude and constant frequency when the electric shafts 10 are switched off, for example when the watercraft is in port and has no need of drive power.

In this arrangement, the generators 11 are constructed as synchronous machines with a rotating HTS field winding (that is to say an HTS winding in the rotor). Machines of this kind have low synchronous reactance and thus high stiffness in the current/voltage characteristic curve. For example, in this connection FIG. 2 shows the characteristic curve of a synchronous generator with a rotating HTS field winding and an output of 400 kW for the case of top load increase, from zero to 380 kW. A machine of this kind has for example a synchronous reactance in the d axis of xd=0.15. As can be seen from the graph of the current curve I and the voltage curve U, when the load is switched on at point tz there is no drop in the voltage U. This shows that the operational behavior of a machine of this kind is extremely stable, even under extreme fluctuations in load.

In the case of the watercraft 1, the onboard power network converters 15 do not therefore suffer any perceptible disturbance to their input voltage in the event of abrupt changes in the load from the propeller (as caused for example if the propeller 14 goes in and out of the water in heavy seas). Thus, the onboard power network converters 15 can have substantially smaller dynamic reserves than when conventional synchronous machines with no HTS winding are used as generators in the drive lines 2. Moreover, complex regulation in the drive lines 2, for stabilizing the speed (and hence the voltage and frequency) of the respective drive motor 12 and propeller 14, can be dispensed with.

The construction of the drive motors 12 as high-power and high-torque synchronous machines having a rotating HTS field winding (that is to say an HTS winding in the rotor) is also advantageous.

In this arrangement, each of the electric drive shafts 10 additionally includes a generator synchronizing device 20, for synchronizing the amplitude, frequency and phase of the voltages generated by the generators 11.

Furthermore, associated with each of the onboard power network converters 15 is an onboard power network synchronizing device 21, for synchronizing the amplitude, frequency and phase of the output voltage of the onboard power network converter 15 to the amplitude, frequency and phase of the voltage from the onboard power network 3 when the voltage generated by the generators 11 of the respective electric shaft 10 exceeds a predetermined minimum amplitude and minimum frequency.

Advantageously, each of the controllable-pitch propellers 14 is constructed such that it can be set to zero thrust (that is to say no thrust) if the voltage generated by the generators 11 of the associated electric shaft 10 falls below a predetermined minimum amplitude and minimum frequency. This ensures that supply from the onboard power network 3 lasts as long as possible even in the event of a drop in the generator output. Another way of setting to zero thrust is to switch the propeller 14 to zero thrust by way of a coupling.

In port, when the electric shafts 10 are switched off the onboard power network 3 may also be fed by a battery or by fuel cells, instead of by the harbor generator 16.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An electric drive shaft, comprising:
   a plurality of generators of variable speed, to generate a voltage of variable amplitude and variable frequency, the generators including a superconductor winding;
   at least one drive motor, supplied with the generated voltage and variable in speed;
   a generator synchronizing device, to synchronize the amplitude, frequency and phase of the generated voltage fed to the at least one drive motor;
   an onboard power network synchronizing device, to synchronize amplitude, frequency and phase of an output voltage of an onboard power network converter to the amplitude, frequency and phase of the voltage from an onboard power network if the voltage generated by the generators exceeds a minimum amplitude and minimum frequency; and
   at least one internal combustion engine that drives the generators, wherein the generator synchronizing device is connected to the generators via the internal combustion engine and the generators are synchronized only when the internal combustion engines are synchronized.

2. The electric drive shaft of claim 1, wherein the at least one drive motor includes a superconductor winding.

3. The electric drive shaft of claim 1, wherein the superconductor winding is a rotating field winding.

4. The electric drive shaft of claim 1,
   wherein the onboard power network converter is supplied with the voltage of variable amplitude and variable frequency, to convert supplied voltage to a voltage of constant amplitude and constant frequency for the onboard power network.

5. A craft, comprising:
   at least one drive line including an electric drive shaft according to claim 1, to drive the craft and including the onboard power network to supply electrical consumers on board the craft.

6. The craft of claim 5, further comprising:
   an additional onboard power network generator, to supply the onboard power network with a voltage of constant amplitude and constant frequency when the electric shaft is switched off.

7. The craft of claim 5, further comprising, coupled to the at least one drive motor, a propelling unit, the propelling unit being settable to zero thrust if the voltage generated by the generators falls below a minimum amplitude and minimum frequency.

8. The electric drive shaft of claim 1, wherein the superconductor winding is a high-temperature superconductor (HTS) winding.

9. The electric drive shaft of claim 2, wherein the superconductor winding of the generators is a high-temperature superconductor (HTS) winding.

10. The electric drive shaft of claim 9, wherein the superconductor winding of the at least one drive motor is a high-temperature superconductor (HTS) winding.

11. The electric drive shaft of claim 2, wherein the superconductor winding of the generators is a rotating field winding.

12. The electric drive shaft of claim 2, wherein the superconductor winding of the at least one drive motor is a rotating field winding.

13. The craft of claim 5, wherein the craft is a watercraft.

14. The craft of claim 6, further comprising, coupled to the at least one drive motor, a propelling unit, the propelling unit being settable to zero thrust if the voltage generated by the generators falls below a minimum amplitude and minimum frequency.

15. The craft of claim 7, wherein the propelling unit is a controllable-pitch propeller whereof the power output is variable.

16. The craft of claim 14, wherein the propelling unit is a controllable-pitch propeller whereof the power output is variable.

17. The electric drive shaft of claim 1, wherein the generator synchronizing device, synchronizes the amplitude, frequency and phase of the generated voltage fed directly to the at least one drive motor.

18. The electric drive shaft of claim 1, wherein the at least one drive motor is operated without a converter between the at least one drive motor and the at least one generator.

* * * * *